United States Patent Office 2,856,412
Patented Oct. 14, 1958

2,856,412

PRODUCTION OF META-DIOXANES

Edward S. Wheeler, Secane, Pa., assignor to The Atlantic Refining Company, Philadelphia, Pa., a corporation of Pennsylvania No Drawing. Application February 28, 1957
Serial No. 642,937

3 Claims. (Cl. 260—340.7)

This invention relates to a process for the production of meta-dioxanes. More particularly it relates to a process for the production of meta-dioxanes having the general formula:

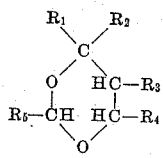

in which $R_1$ is an alkyl radical and $R_2$, $R_3$, $R_4$ and $R_5$ are selected from the group consisting of hydrogen atoms, alkyl radicals and aryl radicals.

It is known in the art that meta-dioxanes may be produced by reacting an olefin hydrocarbon with an aldehyde in the presence of an aqueous sulfuric acid catalyst. In the case of the isobutylene-formaldehyde condensation the following reaction occurs:

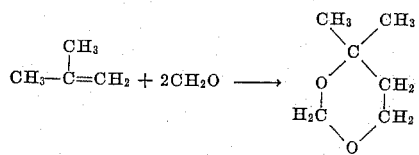

In addition varying amounts of 1,3 glycols, in this instance 3-methyl-1,3-butanediol, are formed depending upon the concentration of the catalyst and the reaction temperature.

In general, the concentration of the sulfuric acid catalyst may range between 2 and 85 weight percent and the reaction temperature may vary between 5° and 150° C. depending upon the type of olefin used. When the reaction is carried out in this manner it has been necessary in the past to neutralize the acid mixture formed so as to effect a separation between the organic and aqueous layers. If the acid mixture is not neutralized a great deal of difficulty is often encountered in obtaining a clean and rapid separation of these layers and in many instances the layers do not separate at all. However, even when the mixture is neutralized an appreciable amount of the desired organic layer is lost because it is soluble to some degree in the aqueous layer and conversely a portion of the aqueous layer is always dissolved in the organic layer.

Moreover, when the mixture is neutralized the acid is no longer available so that the sulfuric acid normally contained in the aqueous layer cannot be recycled for use as a catalyst in the further formation of meta-dioxanes nor can the sulfuric acid normally found in the organic layer be used as a catalyst in the subsequent formation of diolefins for which the meta-dioxanes are intermediates.

It is therefore an object of this invention to produce meta-dioxanes by a process in which there is a clean and rapid separation of the aqueous and organic layers formed and in which these layers are only soluble in each other to a limited extent.

It is another object of this invention to produce meta-dioxanes without the necessity of neutralizing the acid mixture formed.

It is a further object of this invention to produce meta-dioxanes in a manner such that the aqueous layer formed can be recycled for use as a catalyst in the formation of such meta-dioxanes and the sulfuric acid in the organic layer can be further utilized as a catalyst in the subsequent formation of diolefins from said meta-dioxanes.

It is a further object of this invention to produce meta-dioxanes having improved color characteristics.

Further objects and advantages will be apparent from the description of the invention in the specification and from the appended claims.

It has now been discovered that when an inorganic salt such as sodium sulfate or sodium chloride is added to the sulfuric acid catalyst in the olefin hydrocarbon-aldehyde reaction vessel, the acid mixture formed separates cleanly and rapidly into an organic layer and an aqueous layer. Unlike the neutralization procedure the amount of meta-dioxanes dissolving in the water layer is relatively slight and in fact, on recycling the aqueous layer, such amount shortly reaches an equilibrium whereby no more of the organic layer is dissolved in the aqueous layer. A higher recovery of the desired organic layer is thus obtained. The aqueous layer formed may be recycled to the olefin-hydrocarbon reaction vessel with the addition of a small amount of inorganic acid, and used as the catalyst for the further formation of meta-dioxanes. The sulfuric acid contained in the organic layer may be utilized as the acid catalyst in the subsequent formation of diolefins from the meta-dioxanes. There is also a marked improvement in the color of the meta-dioxanes formed in this manner.

In accordance with the present invention, olefin hydrocarbons and aldehydes are condensed in the presence of aqueous $H_2SO_4$ solutions of between 2 and 85 weight percent at temperatures ranging from 5° to 150° C. A stoichiometric mole ratio of 2 moles of aldehyde per mole of olefin may be used, but it is preferable to use slightly more than one mole of olefin. From about 5 weight percent to about 20 weight percent of an inorganic salt, based on the weight of aldehyde, is added to the reaction vessel. Generally, primary olefins require acid catalysts of higher concentration, usually from about 50 to about 85 weight percent concentration, while secondary and tertiary olefins require more dilute acids. Isobutylene for instance can be reacted with sulfuric acid of from 10 to 40 weight percent concentration, a concentration of about 25 weight percent being preferred, to form 4,4-dimethyl meta-dioxane. Butene-2 can be reacted with sulfuric acid of from 40 to 60 weight percent concentration, about 43 weight percent being preferred, to form 4,5 dimethyl meta-dioxane. The olefin and aldehyde are reacted for a period of from one half to three hours at the preferred temperature, in the case of isobutylene and butene-2 the preferred temperature being from about 60 to 80° C.

The reaction vessel is cooled and the acid mixture poured into a separatory funnel. The acid mixture separates cleanly and rapidly into an organic layer and an aqueous layer. The aqueous layer containing the inorganic salt, acid and small amount of organic material is recycled to the reaction vessel with the addition of make up acid, about 15 weight percent additional concentrated sulfuric acid being required when isobutylene is used. The organic layer contains the meta-dioxane and sufficient sulfuric acid to act as a catalyst in the formation of diolefins, such as isoprene, from the meta-dioxane. In the formation of isoprene the organic layer obtained from the condensation of paraformaldehyde with isobutylene or butene-2 may be reacted with an alcohol such as butanol or propanol utilizing two moles of alcohol for each mole of meta-dioxane, with an excess of alcohol preferred. Organic acids such as acetic acid or propionic acid may also be used to form isoprene from the meta-dioxane. The product is distilled yielding a two layer distillate. The distillate need not be separated but is redistilled to yield isoprene.

The instant invention may be illustrated by the following examples:

EXAMPLE I

Various olefin hydrocarbon-aldehyde reactions were carried out with and without the addition of inorganic salts. The first series of reactions designated runs 1 to 4 in the table below were run in duplicate without the addition of any inorganic salt. The second series of reactions designated runs 5 to 9 in the table below were run in duplicate also (with the exception of 8 and 9) with the addition of various inorganic salts. In the first series 180 grams of isobutylene were reacted with 180 grams of para-formaldehyde in the presence of 175 grams of 25 weight percent aqueous sulfuric acid. The reactions were carried on for a period of 80 minutes in a thermostated bath kept at 140° F. The reaction vessels were cooled and the organic and aqueous layers allowed to separate. The weights and volumes of the respective layers as well as the colors of the organic layers were then noted. The average of each duplicate set is recorded in Table I. Runs 5, 6 and 7 of the second series were run in the same manner except that 25 grams of sodium sulfate were added to the reaction vessel in run 5 before the reaction was begun. Similarly 25 grams of sodium chloride and 25 grams of potassium acid phosphate were added to runs 6 and 7 respectively. Single runs 8 and 9 were made with butene-2 instead of isobutylene and 43 weight percent of aqueous sulfuric acid was used as the catalyst in each. 25 grams of sodium sulfate were added to the reaction vessel in run 8 and 25 grams of sodium chloride were added to the reaction vessel in run 9. Both salts were added before the reactions were begun. The reactions were then carried on in the same manner as the first series and the weights and volumes of the aqueous and organic layers as well as the color of the organic layers were noted. The average of each duplicate set as well as single runs 8 and 9 are recorded in Table I.

The results indicate clearly that when an inorganic salt is added to the olefin-aldehyde reaction vessel no trouble is encountered in obtaining a separation between the aqueous and organic layers. Furthermore the increase in volume in the organic layers proves that little of the desired organic layer is lost in the aqueous layer when the instant invention is practiced. There is also a marked improvement in the color of the meta-dioxanes when inorganic salts are added.

Various inorganic salts were added in various amounts to the organic and aqueous layers produced in the first four runs. Some improvement in separation was noted, but in general this was quite erratic and did not give completely satisfactory separations. If, however, the aqueous layer containing the inorganic salt is recycle, subsequent acid reaction product mixtures will separate readily and cleanly.

EXAMPLE II

Samples of the organic layers from each set of duplicate runs designated 5 and 6 in Example I were titrated to determine the amount of sulfuric acid contained therein. The layers contained an average of 6 grams of sulfuric acid. The aqueous layers from these runs were recycled to the olefin-aldehyde reaction vessels and 6 gms. of concentrated sulfuric acid were added to each flask. 180 grams of isobutylene and 180 grams of paraformaldehyde were added to each flask and the reactions were carried out in the same manner as in Example I without the addition of more inorganic salt. The weights and volumes of the organic and aqueous layers and the colors of the organic layers were noted. The average of each set of duplicate runs is recorded as runs 10 and 11 in Table II.

*Table II*

| Run No | 10 | 11 |
|---|---|---|
| Weight of Paraformaldehyde (gms.) | 180 | 180. |
| Weight of Isobutylene (gms.) | 180 | 180. |
| Weight of Aqueous Layer (gms.) | 192 | 187. |
| Weight of Conc. $H_2SO_4$ added (gms.) | 6 | 6. |
| Weight of Organic Layer (gms.) | 358 | 379. |
| Volume of Organic Layer (mls.) | 384 | 401. |
| Weight of Water Layer (gms.) | 198 | 168. |
| Volume of Water Layer (gms.) | 149 | 125. |
| Color of Organic Layer | Light Yellow. | Light Yellow. |

These results indicate that the aqueous layers containing the inorganic salt and most of the original sulfuric acid may be recycled and, with the addition of a small amount of make-up acid, may be used as the catalyst for further formation of meta-dioxanes. The inorganic salt contained in the aqueous layers from previous runs was sufficient to effect a clean separation of the respective layers and preclude the solution of the organic layer in the aqueous layer. It also assured the formation of a light-colored product.

*Table I*

| Run No | 1 | 2 | 3 | 4 | 5 | 6 | 7 | 8 | 9 |
|---|---|---|---|---|---|---|---|---|---|
| Wt.—Paraformaldehyde (gms.) | 180 | 180 | 180 | 180 | 180 | 180 | 180 | 180 | 180. |
| Wt.—Salt (gms.) | | | | | $Na_2SO_4$, 25. | NaCl, 25. | $KH_2PO_4$, 25. | $Na_2SO_4$, 25. | NaCl, 25. |
| Wt.—25 wt. percent $H_2SO_4$ | 175 | 175 | 175 | 175 | 175 | 175 | 175 | 43 wt. percent $H_2SO_4$, 175. | 43 wt. percent $H_2SO_4$, 175. |
| Wt.—Olefin (gms.) | Isobutylene, 180 | Isobutylene, 180 | Isobutylene, 180 | Isobutylene, 180 | Isobutylene, 180 | Isobutylene, 180 | Isobutylene, 180 | Butene-2, 180. | Butene-2, 180. |
| Wt.—Organic Layer (gms.) | 146 | 155 | No Separation. | 169 | 384 | 381 | 326 | 309 | 343. |
| Vol.—Organic Layer (mls.) | 150 | 163 | ...do | 174 | 394 | 403 | 325 | 340 | 380. |
| Wt.—Water Layer (gms.) | 392 | 378 | ...do | 359 | 184 | 182 | 235 | 253 | 227. |
| Vol.—Water Layer (mls.) | 373 | 340 | ...do | 335 | 141 | 142 | 200 | 185 | 170. |
| Color—Organic Layer | Dark Yellow. | Dark Yellow. | Dark Yellow. | Dark Yellow. | Very Pale Yellow. | Very Pale Yellow. | Very Pale Yellow. | Very Pale Yellow. | Very Pale Yellow. |

EXAMPLE III

A portion of the organic layer from run 5 in Example I containing 116 grams of crude 4,4 dimethyl meta-dioxane was added to 180 gms. of n-butanol and distilled through an 18 cm. Vigreux column to an overhead temperature of 110° C. No additional $H_2SO_4$ was added. The weight of the distillate obtained was 159.0 g. and the weight of the residue was 141.4 g. The two-layer distillate, containing isoprene, water and alcohol, was redistilled, the main portion distilling at 32°–42° C., yielding a disstillate of isoprene weighing 28 gms., a residue of 126 gms. and a loss of 5 gms.

This experiment proves that the organic layer obtained by the process of this invention contains sufficient sulfuric acid to act as a catalyst in the formation of diolefins, such as isoprene, from the meta-dioxane. The use of the organic layer as a catalyst for diolefin formation and the use of the aqueous layer as a catalyst for the further formation of meta-dioxanes is not possible when the acid mixture is neutralized according to the prior art procedures.

Examples of the meta-dioxanes which can be formed by the process of the instant invention are 4-methyl-m-dioxane, 4,4-dimethyl-m-dioxane, 4,5-dimethyl-m-dioxane, 2,4,4-trimethyl-m-dioxane, 4,4,5-trimethyl-m-dioxane, 2,4,4,6-tetramethyl-m-dioxane, 4-normal propyl-m-dioxane, 4-ethyl-4-methyl-m-dioxane, 4,4-diethyl-m-dioxane, 4,4-dimethyl-2,6-diphenyl-m-dioxane, 2,4,4,5,6-pentamethyl-m-dioxane, and 4-phenyl-m-dioxane.

Among the aldehydes that may be used are benzaldehyde, acetaldehyde, propionaldehyde, formaldehyde and substances yielding formaldehyde, such as paraformaldehyde, with paraformaldehyde being preferred.

The olefins used in the instant reaction may be primary, secondary or tertiary olefins. Generally, the more reactive secondary and tertiary olefins require a more dilute acid catalyst than the primary olefins in order to prevent polymerization of the olefin or of the product. Propylene for instance requires about 83 wt. percent acid while isobutylene, 2-methylbutene-1 and 2-methylbutene-2 can be reacted with 10–40 wt. percent acid and butene-2 with 40–60 wt. percent acid. Excellent results were obtained when the instant invention was used in reacting isobutylene with paraformaldehyde at a temperature of 60° C. in the presence of 25 weight percent aqueous sulfuric acid. When reacting butene-2 the preferred concentration of sulfuric acid is 43 weight percent. Likewise higher molecular weight olefins may be used such as di-isobutylene, tri-isobutylene, polypropylenes, including the pentamers, hexamers, etc.

The inorganic salt used may be any salt which is soluble in dilute sulfuric acid such as sodium sulfate, sodium chloride, and potassium acid phosphate. Best results are obtained with sodium sulfate. From 5 to 20 weight percent of the inorganic salt, based on the aldehyde, may be used, 15 weight percent being preferred. When insufficient inorganic salt is used multi-layer systems may result or if a two-layer system results the inorganic and aqueous layers are mutually soluble in each other to a greater degree than desired. It has been pointed out that although the salt may be added to the acid mixture after the reaction is completed, the results obtained are erratic, but that the best results are obtained when the salt is added before the reaction is begun, whether initially or by recycle.

The meta-dioxanes produced by the process of the instant invention may be used as solvents for resins and lacquers, as gasoline blending agents to impart antiknock properties, as solvents for dewaxing operations and as intermediates for the production of organic chemicals.

As an example of their use as intermediates they may be converted to diolefins by reaction with organic alcohols containing from 2 to 8 carbon atoms or with organic acids containing from 2 to 6 carbon atoms in the presence of a sulfuric acid catalyst. Isoprene, for example, may be prepared from 4,4-dimethyl-meta-dioxane or 4,5-dimethyl-meta-dioxane by reaction with butanol, propanol, ethanol, acetic acid or propionic acid.

I claim:

1. In the method for reacting an olefin-hydrocarbon selected from the group consisting of isobutylene, butene-2, and propylene with an aldehyde selected from the group consisting of formaldehyde, substances yielding formaldehyde, acetaldehyde, propionaldehyde and benzaldehyde to produce the corresponding meta-dioxanes by contacting said olefin-hydrocarbon with said aldehyde at a temperature of about 5° C. to 150° C. in the presence of aqueous sulfuric acid ranging in concentration from about 2 to 85 weight percent and separating the organic and aqueous layers thus formed, the improvement which comprises contacting the reactants prior to the reaction with from about 5 to about 20 weight percent, based on the weight of the aldehyde, of an inorganic salt selected from the group consisting of sodium sulfate, sodium chloride and potassium acid phosphate.

2. The method according to claim 1 in which the inorganic salt is sodium sulfate.

3. The method according to claim 1 in which the inorganic salt is sodium chloride.

References Cited in the file of this patent
UNITED STATES PATENTS

| | | |
|---|---|---|
| 2,296,004 | Platt | Sept. 15, 1942 |
| 2,721,223 | Arundale | Oct. 18, 1955 |

OTHER REFERENCES

Avery Adrian Morton, Laboratory Technique in Organic Chemistry, McGraw-Hill, New York, page 196, 1938.

Penrose S. Albright: J. Am. Chem. Soc., vol. 59, pages 2098–2104, November 1937.